(12) United States Patent
Kim

(10) Patent No.: US 8,705,511 B2
(45) Date of Patent: Apr. 22, 2014

(54) SYSTEM AND METHOD FOR SYNCHRONOUS TRANSMISSION OF CONTENT

(75) Inventor: Young-Il Kim, Daejeon-si (KR)

(73) Assignee: Electronics and Telecommunications Research Institute, Daejeon (KR)

(*) Notice: Subject to any disclaimer, the term of this patent is extended or adjusted under 35 U.S.C. 154(b) by 225 days.

(21) Appl. No.: 13/332,801

(22) Filed: Dec. 21, 2011

(65) Prior Publication Data
US 2012/0163427 A1  Jun. 28, 2012

(30) Foreign Application Priority Data
Dec. 23, 2010 (KR) .................. 10-2010-0133821

(51) Int. Cl.
*H04J 3/06* (2006.01)
(52) U.S. Cl.
USPC .......................................... 370/350
(58) Field of Classification Search
None
See application file for complete search history.

(56) References Cited

U.S. PATENT DOCUMENTS

| | | | |
|---|---|---|---|
| 6,778,493 B1* | 8/2004 | Ishii | 370/229 |
| 2007/0028275 A1* | 2/2007 | Lawrie | 725/93 |
| 2008/0133775 A1* | 6/2008 | Peterson et al. | 709/248 |
| 2010/0027455 A1* | 2/2010 | Wang | 370/312 |
| 2010/0094931 A1* | 4/2010 | Hosur et al. | 709/203 |
| 2010/0225811 A1* | 9/2010 | Konvisser | 348/512 |
| 2010/0309929 A1 | 12/2010 | Gao et al. | |
| 2011/0066746 A1* | 3/2011 | Bennett et al. | 709/231 |
| 2012/0320814 A1* | 12/2012 | Chen et al. | 370/312 |

FOREIGN PATENT DOCUMENTS

KR  10-2010-0096213  9/2010

* cited by examiner

Primary Examiner — Hassan Phillips
Assistant Examiner — Prenell Jones
(74) Attorney, Agent, or Firm — Staas & Halsey LLP

(57) ABSTRACT

A synchronous transmission of a content is provided capable of providing a content seamless when a mobile terminal transfers from a currently connected network to another network. The synchronization of contents is ensured to achieve a seamless communication across a plurality of networks.

16 Claims, 7 Drawing Sheets

SYSTEM AND METHOD FOR SYNCHRONOUS TRANSMISSION OF CONTENT

CROSS-REFERENCE TO RELATED APPLICATION

This application claims the benefit under 35 U.S.C. §119(a) of Korean Patent Application No. 10-2010-0133821, filed on Dec. 23, 2010, the disclosure of which is incorporated by reference in its entirety for all purposes.

BACKGROUND

1. Field

The following description relates to a SmartScreen technique for transmission through a wireless/wired network, and more particularly, to a synchronous transmission of contents capable of providing the same content with seamless through a plurality of networks in a communication environment where the same content is transmitted through a plurality of wired/wireless heterogeneous networks.

2. Description of the Related Art

In recent years, SmartScreen has emerged and become popular in which the same content is transmitted through various wired/wireless networks. Accordingly, there has been suggested a technique capable of effectively transmitting One Source Multi-Use (OSMU) based contents and ensuring the mobility of the terminal. The OSMU enables one piece of image information to be used in common in a plurality of terminals.

Since a wireless access network has a limited frequency resource, there is a need for a technique of transmitting a high quality content through a plurality of wireless access networks to ensure QoS/QoE for users.

When the same content is transmitted through a plurality of access networks or a 3-d left image and a 3-d right image of a 3-dimentsional image are transmitted through different access networks, a content synchronization between the different access networks needs to be ensured.

Accordingly, there is a need for a technique capable of ensuring content synchronization over a plurality of access networks when a content is transmitted through a plurality of access networks.

SUMMARY

The following description relates to a technique capable of ensuring the synchronization of a content to achieve the content seamless that is required for the mobility of a terminal when the same content or a 3-D image content is subject to a distributed transmission through a plurality of access networks.

The following description also relates to a content synchronizer for content synchronization and a transmission scheme for content synchronization capable of transmitting a content while ensuring the content seamless on a plurality of access networks for a multi-screen service.

When the same content is transmitted in a distributed transmission based on its characteristic through heterogeneous networks (for example, a Scalable Video Coding (SVC) content is divided into a Base layer and an Enhancement layer and transmitted through different networks, and a 3-d image is divided into a 3-d left image and a 3-d right image and transmitted through different networks) or when the same content is transmitted through different access networks to provide a multi-screen service, the content synchronization needs to be ensured to provide a high quality of image service.3-d3-d In one general aspect, there is provided a synchronous transmission system for transmitting a content to a terminal through at least one base station belonging to a heterogeneous network, the transmission system including: a content server configured to divide the content into contents each having a predetermined size and transmit the divided contents; and a content synchronizer configured to generate a synchronization frame counter for each of the divided contents and transmit the synchronization frame counter through the base station.

The at least one base station communicate with the terminal, transmit the synchronization frame counter to the terminal, receives a response to the synchronization frame counter from the terminal and calculate a delay latency value for the terminal.

The content server includes: a content divider configured to divide the content according to a unit length of a transmission frame of each of the base stations communicating with the terminal; a synchronization frame adder configured to add the synchronization frame counter to the divided content; and a content buffer configured to store the content having the synchronization frame counter added thereto.

The content divider divides the content according to characteristics of the content at each of the base stations communicating with the terminal.

The content synchronizer includes: a synchronization frame generator configured to generate a synchronization frame counter for the divided content; a synchronization frame transmitter configured to transmit the synchronization frame counter to the base station such that the synchronization frame counter is transmitted to the terminal; and a delay transmission value calculator configured to calculate a content delay transmission value in consideration of a delay latency value of each of the base stations and transmit the delay transmission value to the each base station.

The base station includes: a transmitter configured to transmit the synchronization frame counter to the terminal; a receiver configured to receive a response to the synchronization frame counter from the terminal; and a delay latency value calculator configured to calculate the delay latency value for the terminal.

The transmitter transmits the divided contents in consideration of the content delay transmission value such that the divided contents are received by the terminal within a predetermined time.

The base station includes a transmitter that transmits the divided contents in consideration of the content delay transmission value such that the divided contents are received by the terminal within a predetermined time.

The content represents a Scalable Video Coding (SVC) image content that is divided into a Basis Layer and an Enhancement Layer, or a 3-D image content that is divided into a 3-d left image and a 3-d right image.

The content divider divides the content into contents each having a transmission frame length corresponding to a least common multiple of unit lengths of transmission frames of each base station communicating with the terminal The delay transmission value calculator calculates, as the content delay transmission value, a ratio of a difference, which is given between a maximum delay latency value selected among delay latency values of terminals at a predetermined base station among the at least one base station and a delay latency value of the predetermined base station to a unit length of a transmission frame of the predetermined base station.

In another general aspect, there is provided a synchronous transmission method for transmitting a content to a terminal through at least one base station belonging to a heterogeneous network, the synchronous transmission method including: transmitting a synchronization frame counter that corresponds to a unit length of a transmission frame of each of the base stations communicating with the terminal; receiving a delay latency value for the terminal from each of the base stations; and transmitting the content in consideration of the delay latency value such that the content is received by the terminal within a predetermined time.

The synchronous transmission method further includes dividing the content into contents each having a transmission frame length corresponding to a least common multiple of unit lengths of transmission frames of each base station communicating with the terminal.

In the dividing of the content, the content is divided according to characteristics of the content at each of the base stations communicating with the terminal.

The receiving of the delay latency value includes: at the base station, transmitting the synchronous frame counter to the terminal; at the base station, receiving a response to the synchronous frame counter from the terminal; and at the base station, calculating a delay latency value for the terminal.

In the transmitting of the content within a predetermined time, the divided contents are transmitted to terminal through each base station in consideration of the delay latency value.

As described above, when the same content is transmitted in a distributed transmission based on its characteristic through heterogeneous networks (for example, a Scalable Video Coding (SVC) content is divided into a Base layer and an Enhancement layer and transmitted is through different networks, and a 3-d image is divided into a 3-d left image and a 3-d right image and transmitted through different networks) or when the same content is transmitted through different access networks to provide a multi-screen service the content synchronization needs to be ensured to provide a high quality of image service, thereby activating the SmartScreen service and a high quality of 3-D image service and a SVC service.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

There is a need for a technology of performing a distributed transmission on the same content through a plurality of access networks. In addition, there is a need for a technology in which a Multicast and Broadcast Service (MBS) is formed in one access network and the same content is transmitted through distributed transmission to different base stations.

If a 3-D image is transmitted through a single base station of one access network, a great amount of traffic is caused and thus it is difficult to serve a plurality of subscribers. In this regard, there is a need for a technology of dividing a 3-D image into a 3-D left image and a 3-D right image and transmitting the 3-D left image and 3-D right image through different wireless access networks or different base stations.

However, the above transmission schemes require a technology of ensuring the mobility of the terminal and the content seamless. That is, when a terminal moves to another wireless access network or another base station, the terminal needs to continue receiving a content, which has been received from the previous wireless access network or base station, in the other wireless access network or base station to which the terminal is moved.

To this end, according to the present invention, the content is divided and transmitted in a predetermined unit and arrival time of content at each access network is adjusted in consideration of the delay latency of each access network, thereby ensuring the synchronization of the content.

Figure 1:
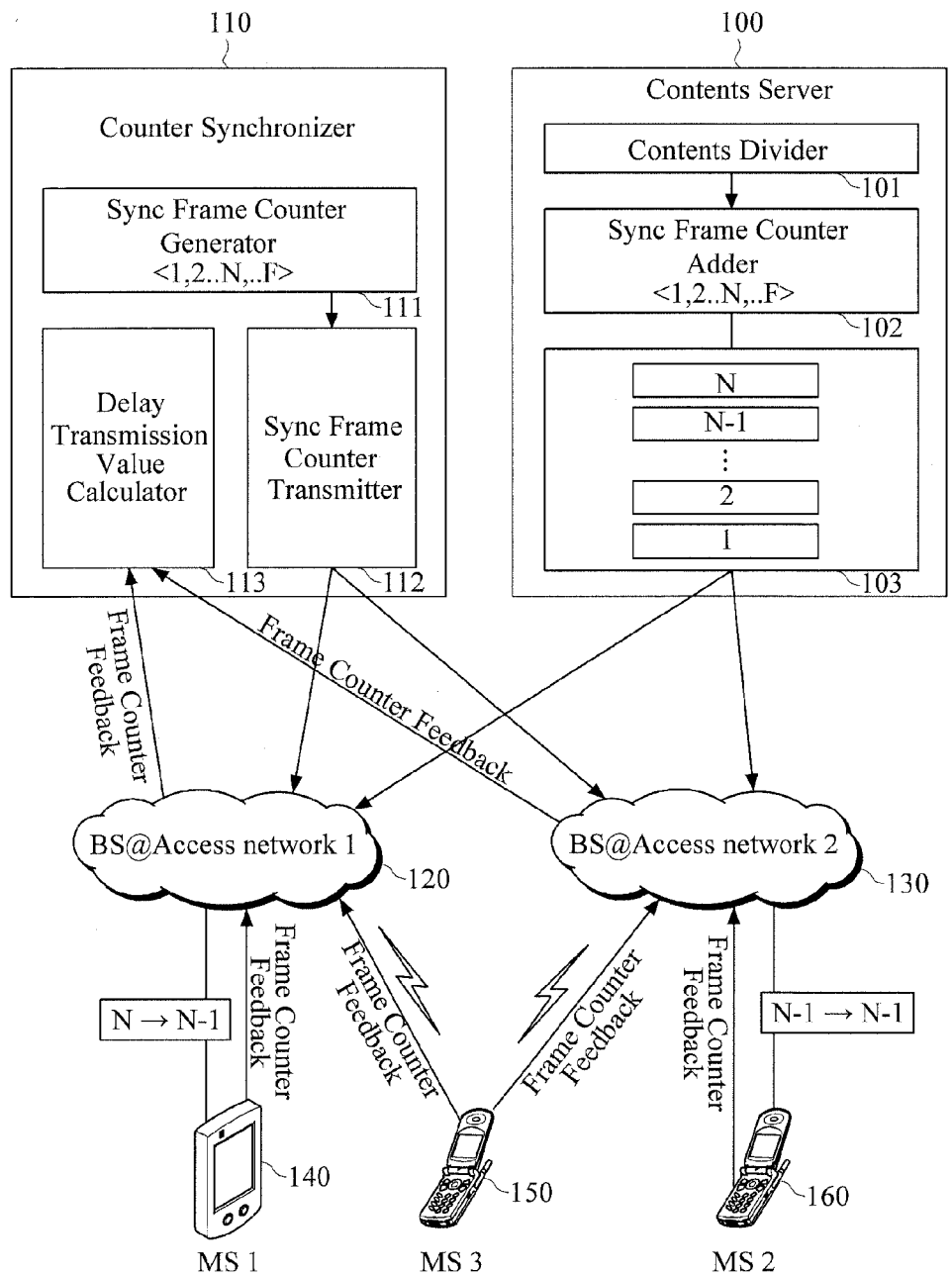
FIG. 1 is a diagram illustrating an example of a system for distributing the same content through a heterogeneous network.

FIG. 1 is a diagram illustrating an example of a system for distributing the same content through a heterogeneous network. As shown in FIG. 1, a system for distributing contents includes a content server 100, a content synchronizer 110 and base stations 120 and 130.

The content server 100 divides a content into contents each having a predetermined size and transmits the divided content.

The content synchronizer 110 generates a synchronization frame counter for the divided is content and transmits the synchronization frame counter through the base stations.

The base stations 120 and 130 communicating with terminals 140, 150 and 160 transmit the synchronization frame counter to the terminals 140, 150 and 160, and receive a response to the synchronization frame counter, thereby calculating a delay latency value for each of the terminals 140, 150 and 160.

The content server 100 divides a content into contents each having a predetermined size and such that the same content is transmitted through a heterogeneous network.

The content server 100 includes a content divider 101, a synchronization frame adder 102 and a content buffer 110.

The content divider 101 divides the content according to a unit length of a transmission frame for each of the base stations communicating with the terminal.

The synchronization frame adder 102 adds the synchronization frame counter to the divided content.

The content buffer 103 stores the content to which the synchronization frame counter is added.

The size of a divided content for content synchronization may have a length corresponding to a least common multiple of unit lengths of transmission frames of access networks.

That is, in order to ensure real time transmission of contents, a content is divided into compressed images each having a time scaled unit corresponding to a least common multiple of the unit lengths (for example, 3 ms and 5 ms) of transmission frames of different access networks.

> Size of Divided Content=LCM (Least Common Multiple)(the length of transmission frames in Access Network 1, . . . and the length of transmission frames in Access Network $N$) [Equation 1]

The content synchronizer 110 generates a synchronization frame counter for contents. The content synchronizer 110 includes a synchronization frame generator 111, a synchronization frame transmitter 112 and a delay transmission value calculator 113.

The synchronization frame generator 111 generates a synchronization frame counter for the divided content.

The synchronization frame transmitter 112 transmits the synchronization frame counter to the base stations 120 and 130 such that the synchronization frame counter is transmitted to terminals.

The delay transmission value calculator 113 calculates a content delay transmission value in consideration of a delay latency value of each base station, and transmits the calculated delay transmission value to the each base station.

The synchronization frame counter for contents operates according to a modular F operation scheme and is broadcasted to the content server 110 and each of the base stations 120 and 130. The content server 110 adds the synchronization frame counter to the divided content, stores the content having the synchronization frame counter added thereto in the content buffer 103, and transmits the content to the base stations 120 and 130 in different access networks.

Each of the base stations 120 and 130 transmits a synchronization frame counter value to terminals that belong to itself, and receives a response to the synchronization frame count value from the terminals 140, 150 and 160, thereby calculating a delay latency value.

An application layer of the terminal 150, which has received a content through two access networks, restores the content in units of divided contents.

Figure 2:
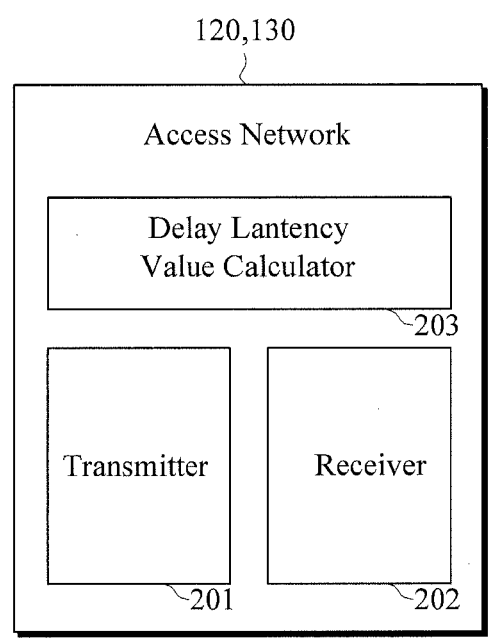
FIG. 2 is a diagram illustrating an example of a base station of a system for disturbing the same content through a heterogeneous network.

FIG. 2 is a diagram illustrating an example of a base station of a system for disturbing the same content through a heterogeneous network. As shown in FIG. 2, each of the base stations 120 and 130 includes a transmitter 201, a receiver 202 and a delay latency value calculator 203.

The transmitter 201 transmits a synchronization frame counter to a terminal. The receiver 202 receives a response to the synchronization frame counter from the terminal. The delay latency value calculator 203 calculates a delay latency value for the terminal.

The transmitter 201 transmits contents, which are divided in consideration of a content delay transmission value, such that the divided contents are received by a terminal within a predetermined time.

Figure 3A:
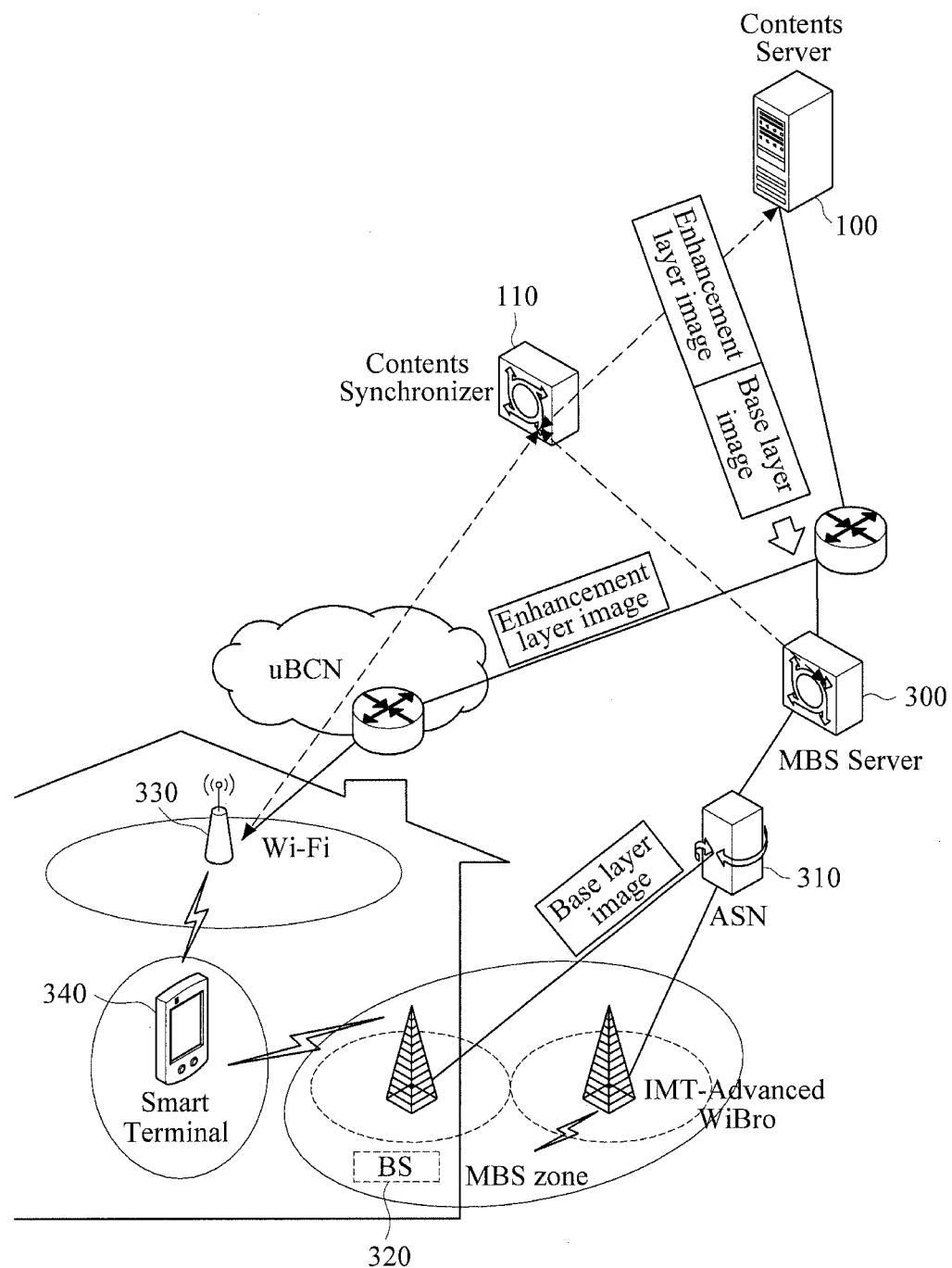
FIGS. 3A and 3B are diagrams illustrating a system for disturbing the same content through a heterogeneous network according to the type of content.
Figure 3B:
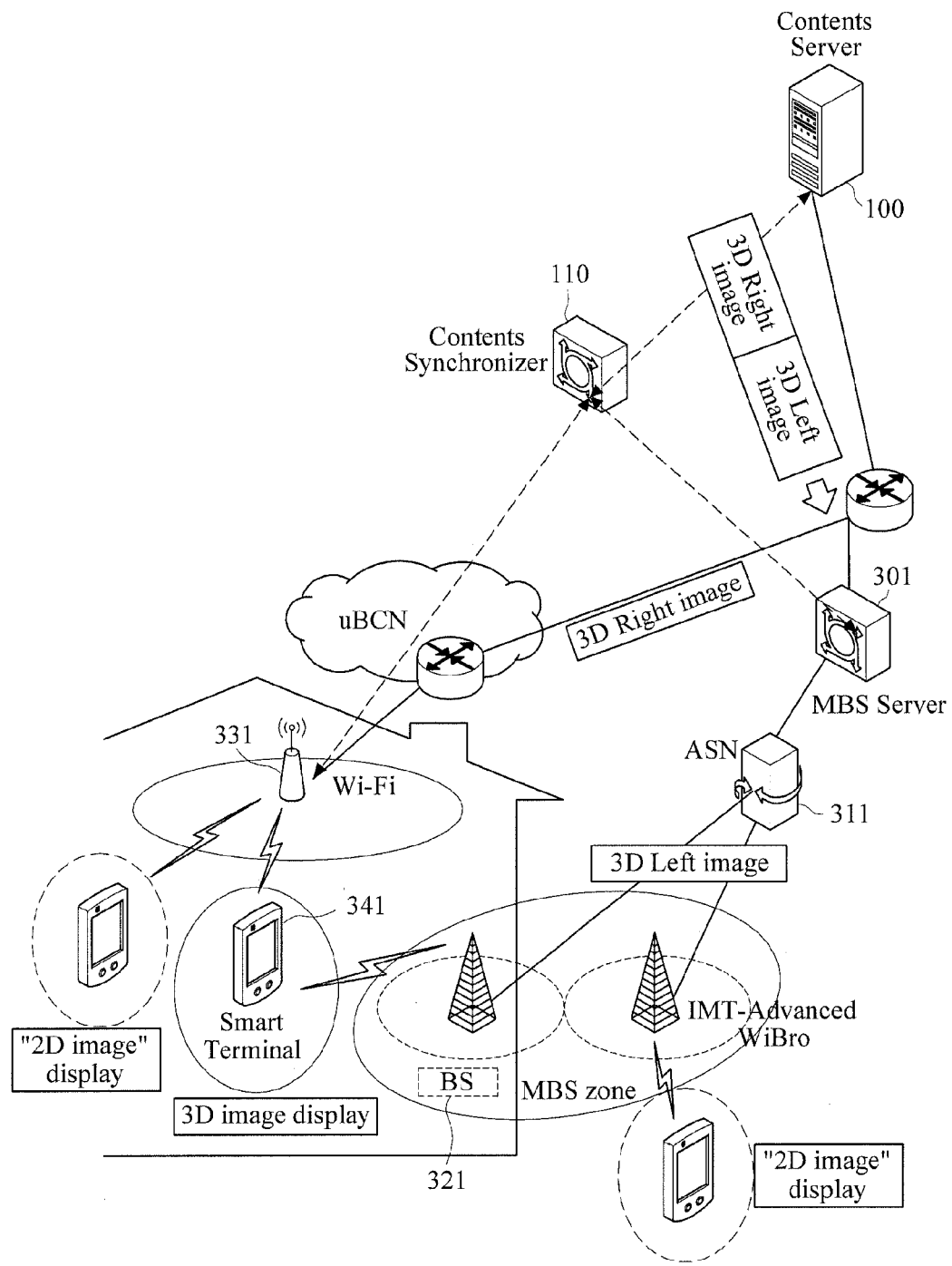

FIGS. 3A and 3B are diagrams illustrating a system for disturbing the same content according to the type of content through a heterogeneous network.

FIG. 3A illustrates a system for distributing a Scalable Video Coding (SVC) content through a heterogeneous network. In FIG. 3A, the content server 100 divides a content into contents each having a predetermined size such that the same content, which is encoded according to SVC, is transmitted through a heterogeneous network.

In this case, a Base layer image of the SVC encoded image is transmitted to a base station 320 via a MBS server 300 and an Access Service Network (ASN) gateway 310 of a mobile network. Meanwhile, an Enhancement layer image of the SVC encoded image is transmitted to a Wi-Fi network 330. A Smart Terminal 340, which is accessible to Wi-Fi through a wireless scheme, receives the Enhancement layer image together with the Base layer image at the same time, and processes the received Base layer image and Enhancement layer image, thereby restoring a high quality of images.

To this end, the terminal 340 needs to receive a Base layer image and an Enhancement layer image, which are synchronized with each other, at the same time and process the received Base layer image and the Enhancement layer image. Accordingly, the transmission time of the contents needs to be adjusted to ensure the synchronization between the contents in different access networks.

FIG. 3B illustrates a system for disturbing a 3-D content through a heterogeneous network, in which the content server 100 divides a 3-D content into contents each having a predetermined size such that a 3-D image is transmitted through a heterogeneous network.

In this case, a 3-D left image of the 3-D image is transmitted to a base station 321 via a MBS server 301 and an ASN gateway 311 of a mobile network. Meanwhile, a 3-D right image of the 3-D image is transmitted to a Wi-Fi network 331.

A Smart Terminal 341, which is accessible to Wi-Fi through a wireless scheme, receives the 3-D left image and the 3-D right image at the same time, and processes the received 3-D left image and the 3-D right image, thereby restoring a high quality of 3-D image.

To this end, the terminal 341 needs to receive a 3-D left image and a 3-D right image, which are synchronized with each other, at the same time and process the received 3-D left image and 3-D right image. Accordingly, the transmission time of the contents needs to be adjusted to ensure the synchronization between contents in different access networks.

Figure 4A:
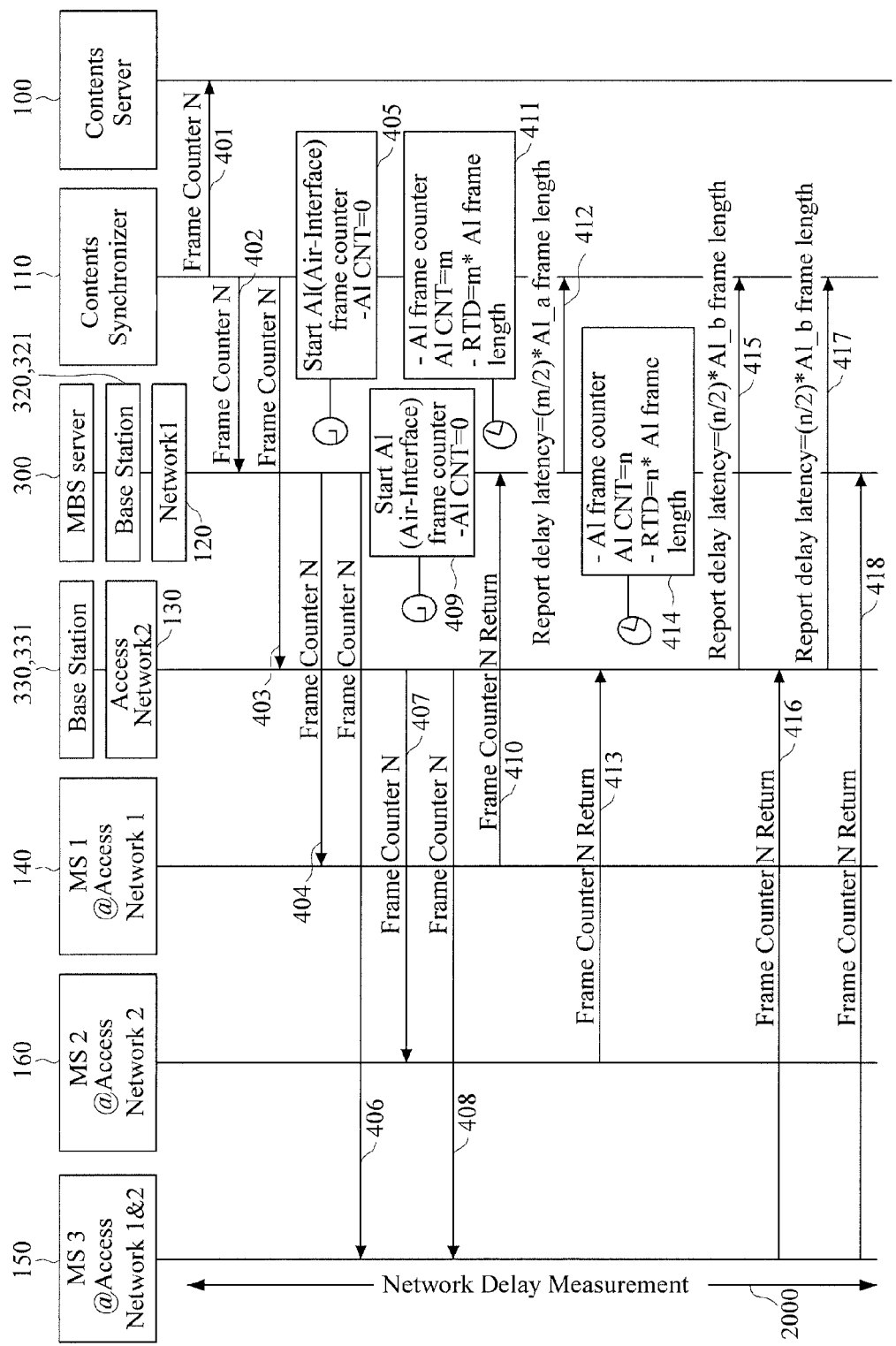
FIGS. 4A and 4B are diagram illustrating the concept of a content synchronous transmission for distributing the same content through a heterogeneous network.
Figure 4B:
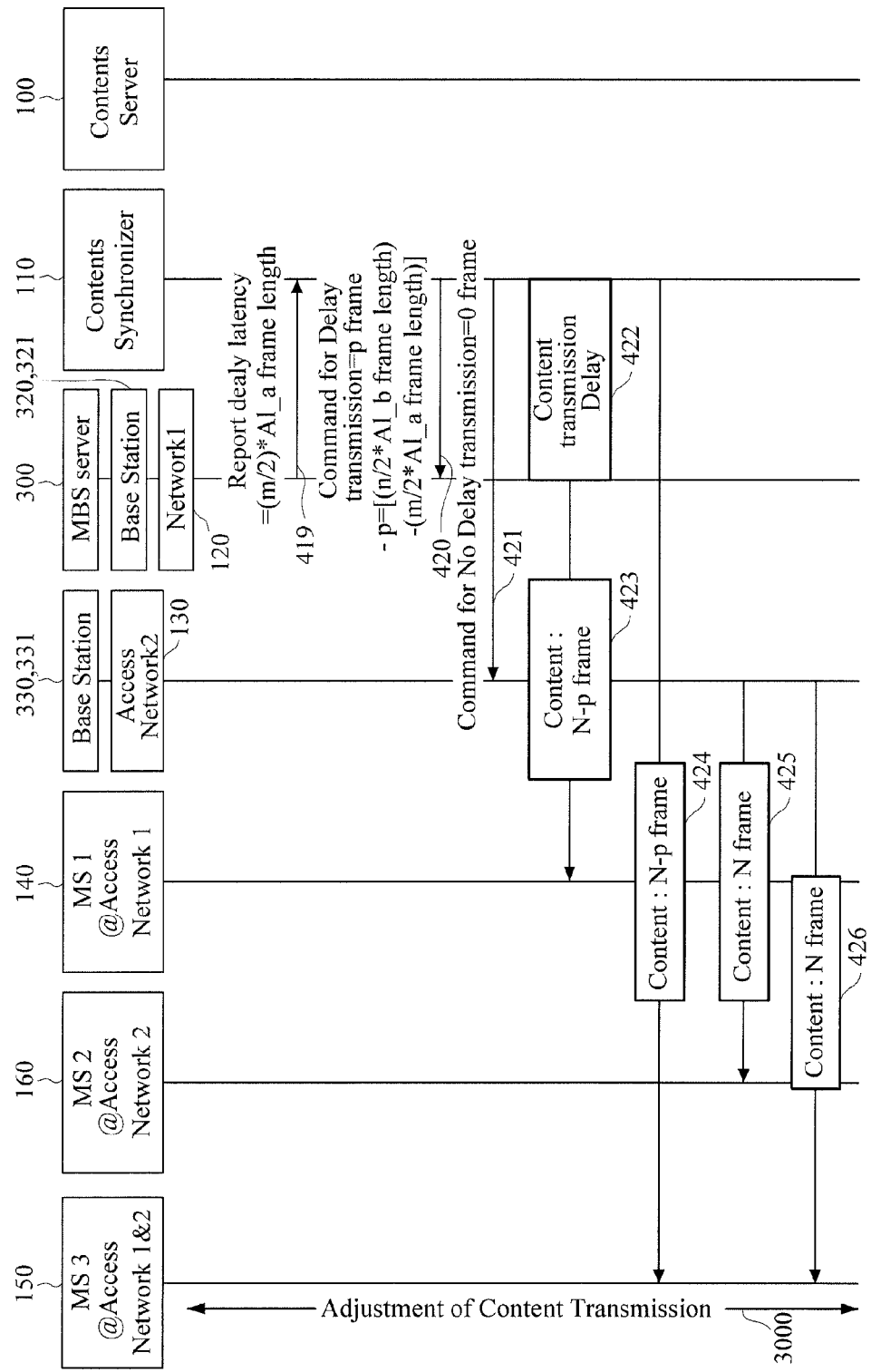

FIGS. 4A and 4B are diagram illustrating the concept of a content synchronous transmission for distributing the same content through different networks.

In FIGS. 4A and 4B, the content synchronizer 110 transmits a frame counter N to the content server 100, the base stations (referred to as 320 and 321 in FIG. 3A and FIGS. 3B, respectively), and the MBS servers (referred to as 300 and 301 in FIGS. 3A and 3B, respectively.

Each of the base stations 120, 130, 320 and 321 transmits the received the frame counter N to the terminals 140, 150, 160, 340 and 341 that belong to itself (404, 406, 407 and 408).

At this time, in order to calculate a Round Trip Delay (RTD), each of the base stations 120, 130, 320 and 321 initiates Air Interface (AI) CNT, and measures the times taken until the Frame counter N is returned back from each terminal (410, 413, 416 and 418) in a unit of AI CNT (405, 409, 411 and 414). Thereafter, each base station calculates a delay latency value from the RTD value, and transmits the calculated delay latency value to the content synchronizer 110 (412, 415, 417 and 419). In this case, the delay latency value is calculated through equation 2 expressed below.

> Delay latency=(RTD/2)*Air Interface frame length [Equation 2]

In FIGS. 4A and 4B, Air Interface Frame Length of access network 1 is denoted as AI_a frame length and Air Interface Frame Length of access network 2 is denoted as AI_b frame length.

The content synchronizer 110 transmits a delay transmission value in a unit of AI frame to each access network such that contents are transmitted to other access networks with a delay based on an access network having the maximum delay latency value among delay latency values received from a plurality of access networks (420 and 421).

The delay transmission value is calculated through equation 3 expressed below.

> (Maximum delay latency−delay latency of each access network)/AI frame length of each access network [Equation 3]

Each access network, having received the delay transmission value from the content synchronizer 110, transmits contents with a delay according to the delay transmission value (423, 424, 425 and 426).

In FIGS. 4A and 4B, the description has been made in relation the base stations 330 and 331 in the access network 2 have a delay latency value larger than those of the base stations 320 and 321 in the access network 1. The base stations 320 and 321 of the access network 1 transmit contents with a delay of p frame as described below equation 4.

$$p \text{ frame}=[\{(n/2*AI\_b \text{ frame length})-(m/2*AI\_a \text{ frame length})\}/AI\_a \text{ frame length}] \quad \text{[Equation 4]}$$

The base stations 320 and 321 of the access network 1 transmits contents with a delay of p frame in a unit of a transmission frame of the access network 1 (AI_a frame length) than an access network having the maximum delay latency.

For example, when a AI_b frame length of the access network 2 is 3 ms, and a Ala frame length of the access network 1 is 5 ms, if the delay latency value of the access network 2 is 12 ms and the delay latency value of the access network 1 is 5 ms, the base station 400 of the access network 1 transmits contents with a delay of 1 frame ([(12−5)15]). In this case, a terminal, which is connected to the access network 1 and the access network 2, receives a content from the access network 1, and 2 ms later, receives a content from the access network 2, thereby receiving contents from the two access networks with a minimum time difference.

For the size of divided contents, when the access network has a frame length of 5 ms and the access network 2 has a frame length of 3 ms, a content is divided in a unit of 15 ms and transmitted, so that the terminal receives an image over 3 frames from the access network 1 and receives an image over 5 frames from the access network 1. In this manner, the terminal receives an image in a unit of 15 ms and restores the image by decoding the received image.

For the delaying of transmission of a content, when the access network 1 has a delay latency of 5 ms and the access network 2 has a delay latency of 12 ms, a content is transmitted with a delay corresponding to a ratio of a difference between the delay latency values of two access networks (12−5) with respect to a unit of a frame length (5). That is, the access network 1 having a smaller delay latency transmits frames with a delay of one frame (Floor (12−5/5))=1).

That is, when the access network 1 and the access network 2 transmit a content corresponding to 15 ms, the access network 1 transmits contents with a delay of 1 frame (5 ms), and the access network 2 transmits contents without delay.

The terminal starts to receive contents in a frame unit of 5 ms from the access network 1 from a point of time of t sec and receive contents in a frame unit of 3 ms from the access network 2 from a point of time of t+2 ms.

That is, the terminal receives a content corresponding to a division unit from the access network 1 at a point of time of t+15 ms(corresponding to 3 frames), and receives a content corresponding to a division unit from the access network 2 at a point of time of t+2 msec+15 msec (corresponding to 5 frames).

Accordingly, the terminal receives an image corresponding to the division unit of 15 ms at a point of time of 17 ms after the terminal starts receiving contents, and restores the received image. To this end, the terminal stores received image contents in the buffer for image processing.

Figure 5:
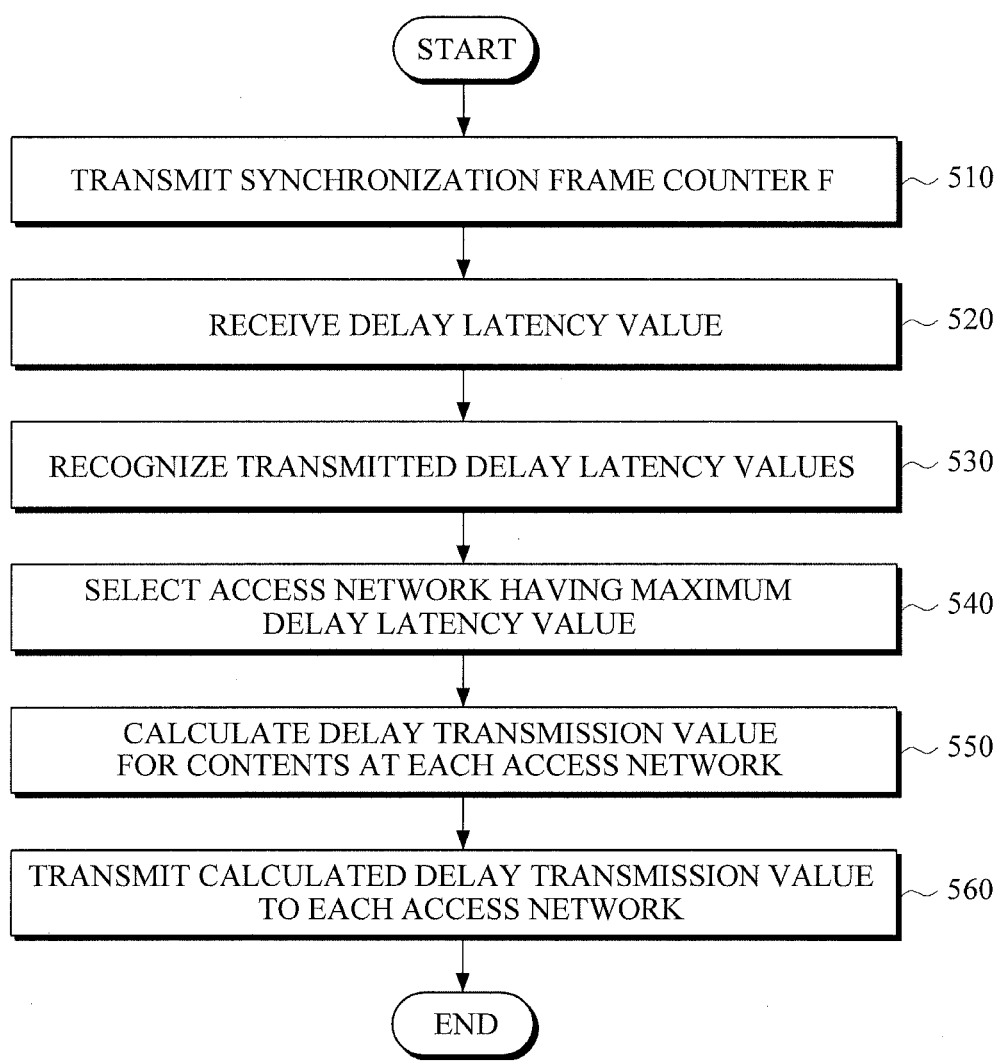
FIG. 5 is a flowchart illustrating an example of distributing the same content through a heterogeneous network.

FIG. 5 is a flowchart illustrating an example of distributing the same content through different networks.

Synchronization frame counters F each having a unit length corresponding to "content division size" are transmitted to all access networks (510). Thereafter, delay latency values are received from each of the access networks (520). The delay latency values transmitted from each of the access networks (base stations) are recognized (530). An access network having the maximum delay latency value is selected (540). A content delay transmission value for each access network is calculated according to equation 3, and the calculated delay transmission value is transmitted to each access network (560). A process of synchronization and distribution of the same content is as follows. A ratio of a difference, which is given between a maximum delay latency value selected among delay latency values of terminals at a predetermined base station among the at least one base station and a delay latency value of the predetermined base station, to a unit length of a transmission frame of the predetermined base station is calculated as a content delay transmission value. The calculated content delay transmission value is transmitted to each base station such that each base station transmits contents to terminals with a delay according to the content delay transmission value.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A synchronous transmission system for transmitting a content to a terminal through at least one base station belonging to a heterogeneous network, the transmission system comprising:

a content server configured to divide the content into contents each having a predetermined size and transmit the divided contents; and a content synchronizer configured to generate a synchronization frame counter for each of the divided contents and transmit the synchronization frame counter through the base station; and a content divider configured to divide the content according to a unit length of a transmission frame of each of the base stations communicating with the terminal;

a synchronization frame adder configured to add the synchronization frame counter to the divided content; and a content buffer configured to store the content having the synchronization frame counter added thereto.

2. The synchronous transmission system of claim 1, wherein the at least one base station communicate with the terminal, transmit the synchronization frame counter to the terminal, receives a response to the synchronization frame counter from the terminal and calculate a delay latency value for the terminal.

3. The synchronous transmission system of claim 1, wherein the content divider divides the content according to characteristics of the content at each of the base stations communicating with the terminal.

4. The synchronous transmission system of claim 3, wherein the content synchronizer comprising:
a synchronization frame generator configured to generate a synchronization frame counter for the divided content;
a synchronization frame transmitter configured to transmit the synchronization frame counter to the base station such that the synchronization frame counter is transmitted to the terminal; and
a delay transmission value calculator configured to calculate a content delay transmission value in consideration of a delay latency value of each of the base stations and transmit the delay transmission value to the each base station.

5. The synchronous transmission system of claim 4, wherein the base station comprises:
a transmitter configured to transmit the synchronization frame counter to the terminal;
a receiver configured to receive a response to the synchronization frame counter from the terminal; and
a delay latency value calculator configured to calculate the delay latency value for the terminal.

6. The synchronous transmission system of claim 5, wherein the transmitter transmits the divided contents in consideration of the content delay transmission value such that the divided contents are received by the terminal within a predetermined time.

7. The synchronous transmission system of claim 4, wherein the base station comprises a transmitter that transmits the divided contents in consideration of the content delay transmission value such that the divided contents are received by the terminal within a predetermined time.

8. The synchronous transmission system of claim 3, wherein the content represents a Scalable Video Coding (SVC) image content that is divided into a Basis Layer and an Enhancement Layer, or a 3-D image content that is divided into a 3-d left image and a 3-d right image.

9. The synchronous transmission system of claim 1, wherein the content divider divides the content into contents each having a transmission frame length corresponding to a least common multiple of unit lengths of transmission frames of each base station communicating with the terminal.

10. The synchronous transmission system of claim 4, wherein the delay transmission value calculator calculates, as the content delay transmission value, a ratio of a difference, which is given between a maximum delay latency value selected among delay latency values of terminals at a predetermined base station among the at least one base station and a delay latency value of the predetermined base station to a unit length of a transmission frame of the predetermined base station.

11. A synchronous transmission method for transmitting a content to a terminal through at least one base station belonging to a heterogeneous network, the synchronous transmission method comprising:
transmitting a synchronization frame counter that corresponds to a unit length of a transmission frame of each of the base stations communicating with the terminal;
receiving a delay latency value for the terminal from each of the base stations; and
transmitting the content in consideration of the delay latency value such that the content is received by the terminal within a predetermined time; and
dividing the content into contents each having a transmission frame length corresponding to a least common multiple of unit lengths of transmission frames of each base station communicating with the terminal.

12. The synchronous transmission method of claim 11, wherein in the dividing of the content, the content is divided according to characteristics of the content at each of the base stations communicating with the terminal.

13. The synchronous transmission method of claim 11, wherein the receiving of the delay latency value comprises:
at the base station, transmitting the synchronous frame counter to the terminal;
at the base station, receiving a response to the synchronous frame counter from the terminal; and
at the base station, calculating a delay latency value for the terminal.

14. The synchronous transmission method of claim 11, wherein the transmitting of the content within a predetermined time comprises:
calculating, as a delay transmission value of the content, a ratio of a difference, which is given between a maximum delay latency value selected among delay latency values selected among delay latency values of terminals at a predetermined base station of the at least one base station and a delay latency value of the predetermined base station, to a unit length of a transmission frame of the predetermined base station;
transmitting the calculated delay transmission value of the content to each base station; and
at the predetermined base station, transmitting the content to the terminal according to the delay transmission value.

15. The synchronous transmission method of claim 12, wherein the content represents a Scalable Video Coding (SVC) image content that is divided into a Basis Layer and an Enhancement Layer, or a 3-D image content that is divided into a 3-d left image and a 3-d right image.

16. The synchronous transmission method of claim 15, wherein in the transmitting of the content within a predetermined time, the divided contents are transmitted to terminal through each base station in consideration of the delay latency value.

* * * * *